United States Patent [19]

Lauer et al.

[11] 4,073,732
[45] Feb. 14, 1978

[54] MEDIA FOR FILTERING BLOOD

[75] Inventors: William Lauer, Madison, N.J.; Herman Charles Mouwen, Ventura, Calif.

[73] Assignees: Johnson & Johnson, New Brunswick, N.J.; Purolator, Inc., Del.

[21] Appl. No.: 621,262

[22] Filed: Oct. 10, 1975

Related U.S. Application Data

[63] Continuation-in-part of Ser. No. 462,453, April 19, 1974, abandoned.

[51] Int. Cl.² ............ B01D 25/04; B01D 25/16
[52] U.S. Cl. .................... 210/491; 55/487; 210/492
[58] Field of Search ............ 210/484, 488, 489, 490, 210/491, 492; 55/487; 128/214 R

[56] References Cited

U.S. PATENT DOCUMENTS

| | | | |
|---|---|---|---|
| 853,981 | 5/1907 | Kneuper | 210/491 |
| 3,003,643 | 10/1961 | Thomas | 210/491 |
| 3,158,532 | 11/1964 | Pall et al. | 210/503 |
| 3,327,859 | 6/1967 | Pall | 210/503 |
| 3,452,877 | 7/1969 | Mesek et al. | 210/491 |
| 3,511,382 | 5/1970 | Mesek | 210/491 |
| 3,593,854 | 7/1971 | Swank | 210/491 |
| 3,759,393 | 9/1973 | Tate et al. | 210/491 |

Primary Examiner—Frank W. Lutter
Assistant Examiner—Frank Sever

[57] ABSTRACT

A media for filtering blood consisting of a layer of fibers having a thickness of at least 0.015 inches. The fibers in the layer are interlocked with one another by frictional entanglement and the layer may have a larger pore opening size on one surface than on the opposite surface.

4 Claims, 7 Drawing Figures

U.S. Patent Feb. 14, 1978 Sheet 1 of 2 4,073,732
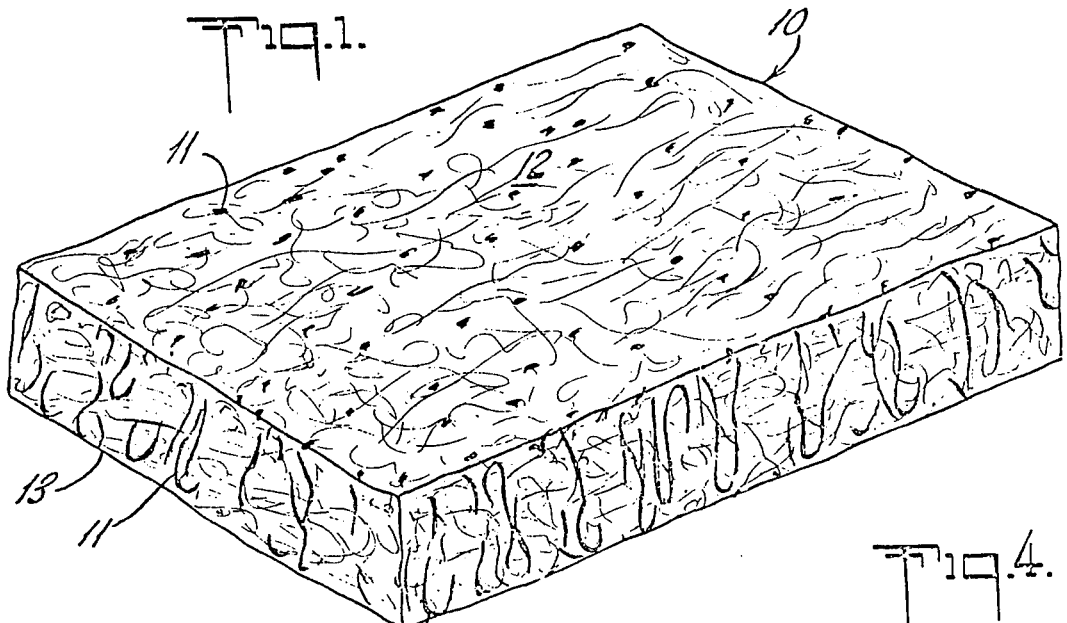
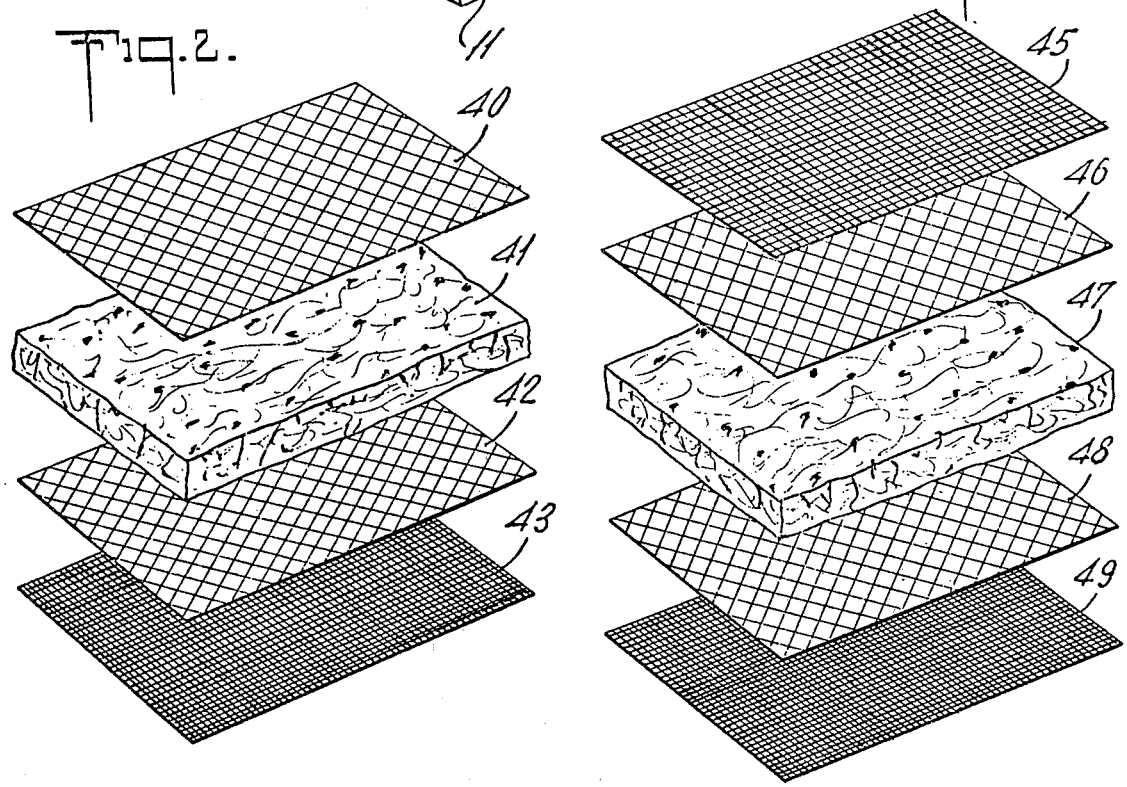
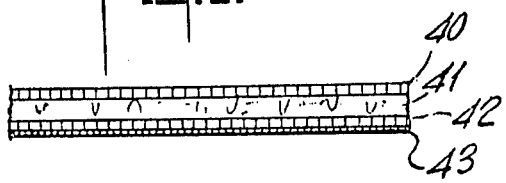
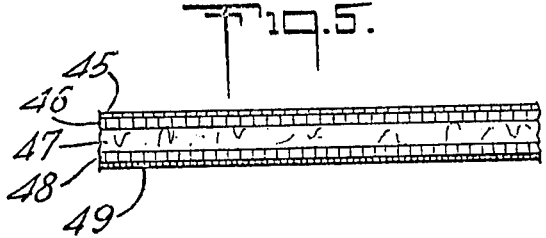

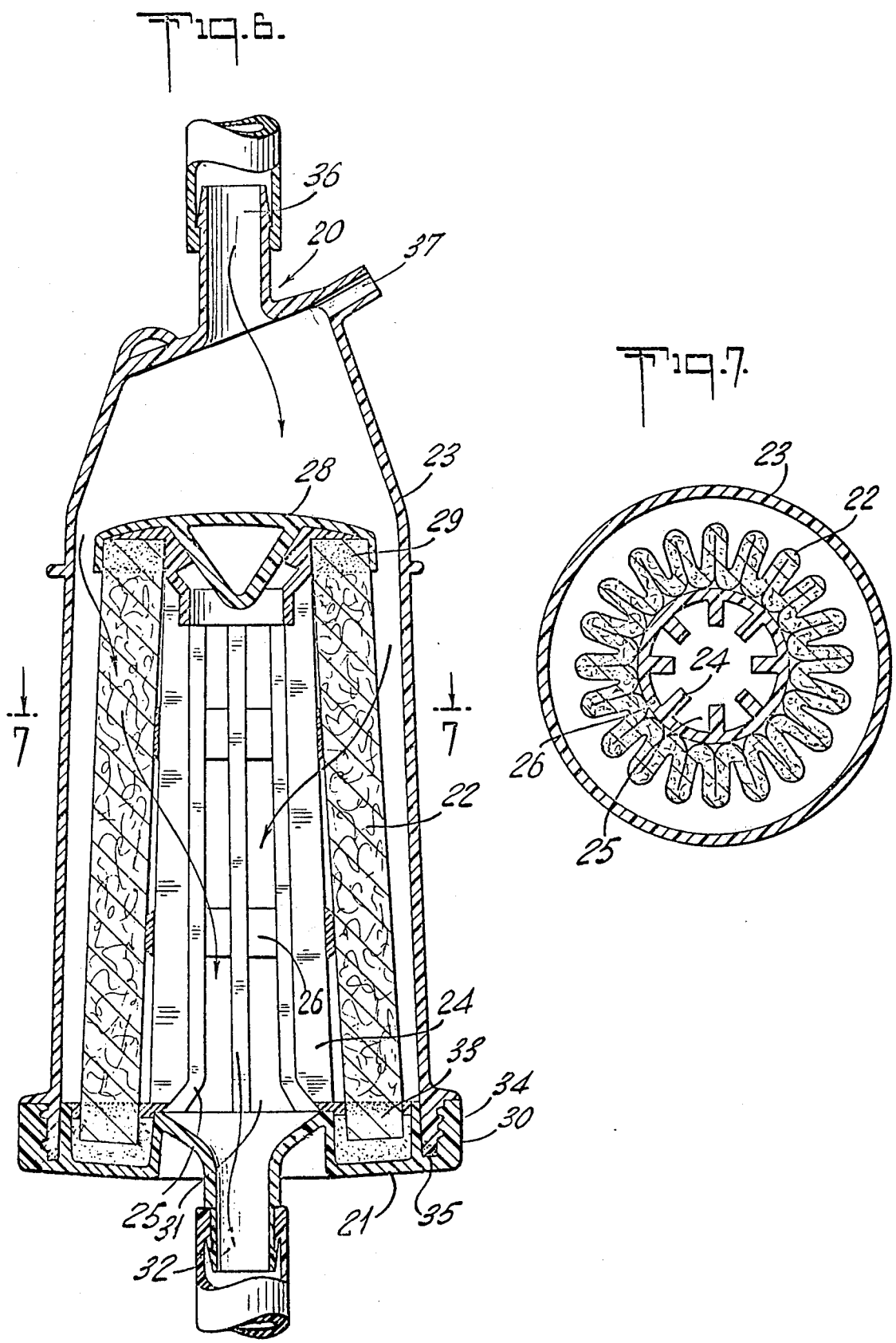

MEDIA FOR FILTERING BLOOD

This is a continuation-in-part application of our co-pending application Ser. No. 462,453 filed Apr. 19, 1974, now abandoned.

BACKGROUND OF THE INVENTION

In both the administration of transfused blood as well as the recirculation of blood from the cardiotomy reservoir during open heart surgery, there may be considerable debris which is removed before the blood is returned to the patient. The blood from the cardiotomy reservoir may contain platelet aggregates, leucocyte aggregates and lipid aggregates or some combination of these which should be removed before the blood is returned to the patient. Transfused blood depending on how long it has been stored may contain the above type of aggregates as well as fibrin clots, agglomeration of protein precipitates and other undesirable debris.

Presently various blood filters are offered which have the objective of removing this undesirable debris from the blood. The media used in these filters are either a surface type filter media or a depth type filter media. The surface media are generally a woven fabric having pore sizes ranging from 20 microns to 170 microns or larger and actually act as a sieve in the filtration. The depth media are either loose fiber packs or foam structures which have a depth of from a few thousandths of an inch to an inch or more, and which have a range of pore size.

Some of the debris in the blood being filtered is deformable. Also some of the blood forms aggregates, which when they contact the media may break up, pass through the media and immediately reagglomerate unless removed by the filtering media. Because of these type of debris, the sieve filters do not do a sufficient job in filtering either transfused blood which has been stored for any length of time or in filtering blood from the cardiotomy reservoir in open heart surgery. Sieve filters or surface media will allow debris that is considerably larger in micron size than the pore opening to be detected in the blood after passing through the filter.

The depth media which filter on a theory of the debris adhering to the surface do not suffer from the same problems as the sieve type units. However, the depth media, such as loose fiber packs, will tend to channel after considerable use such as a number of hours in an extracorporeal circuit used in open heart surgery or after a number of units of whole blood have been filtered as happens in some transfusions. During use, the pressure drop across the media will increase and will create channels in the media and increase the effective pore size of the media allowing some debris to pass through and increases the possibility of reagglomeration as previously described. The flexible open cell foams, though they don't channel, will tend to change pore dimensions under different pressure drops. Hence, as the foam filter becomes blocked and the pressure increases some pores may be closed while adjacent pores are opened or made larger and the effective pore size of the foam is altered considerably.

SUMMARY OF THE INVENTION

We have discovered an improved depth type filter media for filtering blood. Our improved media reduces the problem of agglomerates passing through the media and reagglomerating on the downstream side of the media. Furthermore, our improved media does not channel even after repeated uses in filtering transfused blood or when used for extended periods of time to filter the blood from the cardiotomy reservoir during open heart surgery.

In accordance with the present invention, our new blood filter media consists of a layer of fibers having a thickness or depth of at least 0.015 inch. The media has a pore opening size in the range of 8 to 38 microns. The fibers in the layer are interlocked into their position by entanglement of fibers so that they remain in the position they are placed in the layer during filtration of long duration thus the media itself maintains the desired pore opening size during extended use. In one embodiment of the present invention, the pore size on one surface of the layer of interlocked fibers is larger than the pore size on the opposite surface of the layer to produce a funneling effect through the layer. The larger pore size surface is used on the upstream side of the filter and the smaller pore size surface on the downstream side. In other embodiments of the present invention, our new depth type filter layer of interlocked fibers is used in combination with sieve type filter layers on one or both sides of the layer of interlocked fibers.

BRIEF DESCRIPTION OF THE DRAWINGS

The invention will be further described in conjunction with the accompanying drawings wherein:

FIG. 1 is a perspective view of a filter media according to the present invention.

FIG. 2 is a perspective view of an embodiment of filter media according to the present invention.

FIG. 3 is a view showing the assembly of the media of FIG. 2.

FIG. 4 is a perspective view of another embodiment of filter media according to the present invention.

FIG. 5 is a view showing the assembly of the media of FIG. 4.

FIG. 6 is a cross-sectional view of a filter assembly incorporating media according to the present invention.

FIG. 7 is a cross-sectional view taken along line 7—7 of FIG. 6.

DETAILED DESCRIPTION OF THE INVENTION

Referring to the drawings in FIG. 1, there is shown a perspective view of filter media 10 of the present invention. The fibers 11 are highly entangled with one another so that they are held in place by fiber to fiber entanglement or adhesion without the addition of any chemical or resin bonding agents. The fibers may be highly frictionally entangled by a needling process or by hydraulic processes or other processes for mechanically bonding fibers together.

Needled fiber layers and needle punched fabrics have been known for some time and have been used in a wide variety of end uses. However, it is believed we are the first to use a needle punched fiber layer having a specific pore opening size as a media for filtering blood. Unexpectedly our new blood filter media maintains its original pore opening size during extended use. Furthermore, our new media filters blood in a very uniform manner to improve the efficiency of the filtration. The layer itself consists only of fibers and there are no additives which might have a deleterious effect on the blood being filtered. The fibers are locked in position and held there by frictional entanglement of fiber to fiber; i.e., the fibers are wrapped and entangled with adjacent fibers in a manner so as to resist the densifying of the fibers in the layer which would reduce or alter the pore opening size range of the layer.

If a needling process is used to obtain the entanglement very often the surface which is first penetrated by the needles will have somewhat larger pore size openings than the opposite surface. The pores in the upper surface 12 are slightly larger than the pores in the lower surface 13 to give the media what is termed a "funneling" effect which aids and improves the filtration efficiency of the layer.

The high degree of mechanical bonding and fiber entanglement in our new media provides the added advantage that there is less likelihood that fibers will lint or be removed from the media and placed into the blood stream during filtration.

The fibers which may be used to produce the filter media are any of the well-known synthetic fibers such as the polyester fibers, the polyamide fibers and the like which are inert to blood. The media must have a thickness of at least 0.015 inch in order to provide the desired depth for adequate filtration. The media may be as thick as one inch or more, however, we have found that medias having a thickness of greater than ¼ inch do not improve filtration efficiency and merely add cost.

The media may be used in the filter in various configurations depending upon the shape, form and size of the housing holding the media and depending upon the flow rates and quantities of blood to be filtered. The media may be in the form of a plurality of layers of media or a single layer of media in cartridge form. A preferred form is a fluted cartridge such as shown in FIG. 7.

In FIGS. 6 and 7 there is shown a blood filter unit 20 comprising an assembly for supporting a filter cartridge 21, a filter cartridge 22, and a housing 23. The assembly 21 comprises a core 24 which is cylindrical in shape and is permeable. The core comprises a number of longitudinal struts 25 held in spaced apart relationship by a plurality of annular rings 26. The filter media itself is in the form of a cartridge 22 which has a convoluted configuration and encircles the entire periphery of the core.

Covering the top of the core and the filter media is the top cap 28. The media is sealed to the top cap by a hot melt adhesive 29. Attached to the bottom of the core is the bottom member 30 which extends outwardly from the periphery of the core. This construction leaves the center of the core 31 open to form the outlet 32 for the filter. The media is sealed in the bottom member by hot melt adhesive 33. The outer edge of the bottom member is threaded 34 and carries a suitable gasket 35 so that the bottom member may be securely attached to the filter housing 23 and a tight, leak-proof seal produced at the gasket.

As may be seen in FIG. 6, there is a spacing between core and media over the length of the core. This space aids in allowing air or gas entrapped in the core or in the media or the area therebetween to escape and be discharged from the assembly. Also, the above-described construction allows the entire assembly and cartridge to be flushed and medically cleaned before it is inserted in the housing, sealed and sterilized.

In use the blood being filtered flows from the outside of the filter media, through the media, through the core and out the center outlet of the core.

Surrounding the filter cartridge is the housing 23. The bottom open end of the housing is threaded so it may be joined to the bottom member of the assembly. The housing is cylindrical in shape. The side walls of the housing are slightly tapered to improve the flow characteristics of the filter and aid in the evacuation of gas or air entrapped by the filter. At the top of the filter is an inlet 36 for the incoming blood. The inlet is shown substantially in the center of the top portion of housing though it could be off-set or moved to the side of the housing as desired. Also at the uppermost point of the filter, there is a vent 37 to allow air to escape from the filter as it is being filled and allow any gases removed from the blood to continue to escape during filtration.

In use, the blood enters the top center inlet 36 and flows down over the top cap 28 down along the side walls of the housing to fill up the housing forcing the air to escape through the top vent 37. The blood flows through the filter media to the space between the core and the media and the filtered blood passes through the permeable core and out the center bottom outlet 32. This flow is shown by the arrows in FIG. 6.

Referring to FIG. 2, there is shown a perspective view of a combination of our new blood filter media combined with other materials to provide a filter which is especially suitable for filtering the blood coming from the cardiotomy reservoir of an extracorporeal circuit. The top layer 40 is an open mesh plastic net material which is used for support purposes. The second layer 41 is a layer of needle punched polyester fibers. The layer has a thickness of 0.015 inch and a pore range size of from 8 to 38 microns. The third layer 42 is similar to the first layer. The bottom layer 43 is a woven nylon fabric having a pore opening size of 20 microns. This layer may also be a woven polyester fabric and is used to insure that no fibers or portions of fibers which may be dislodged from layer 41 will enter the bloodsteam. FIG. 3 is a cross-sectional view of the assembly of the layers shown in FIG. 2.

FIG. 4 is a perspective view of a combination of filter layers that is especially suitable for use in filtering transfused blood. In this filter media, the first layer 45 or upstream layer is a woven nylon fabric having a pore opening size of 180 microns. This layer is used to remove the larger debris from the blood and provide for a longer life to the finer pore sized filter media. The remaining layers 46, 47, 48 and 49 are the same as layers 40, 41, 42 and 43 respectively as described in conjunction with FIG. 2. FIG. 5 is a cross-sectional view showing the assembly of the layers in FIG. 4 to form a filter media.

In order to show the unexpected advantages of our new filter media and for comparison purposes, a series of experiments were run. In these runs, it was attempted to keep all variables constant with the exception of the different type of filter media used.

The first filter tested uses media in accordance with the present invention. The media comprises a laminate of a woven polyester fabric having a pore size rating of 180 microns. Downstream of the polyester fabric is an open plastic mesh having a nominal pore size rating of about 1200 microns. Downstream of the plastic mesh is a needle-punched layer of polyester fibers, weighing about 9 ounces per square yard and having a pore size rating of from 8 to 38 microns. Downstream of the needle-punched layer is a woven nylon fabric having a pore size rating of 20 microns. Five units of blood, approximately 500 ml per unit, are passed through this media by gravity flow. The results are given in the following Table I.

TABLE I

| Unit Number | Age of Blood in Days | Flow Rate (ml/min) Start | Flow Rate (ml/min) End | Filter Efficiency (% of particles larger than 16 microns that are removed) |
|---|---|---|---|---|
| 1 | 8 | 27 | 28 | 100 |
| 2 | 8 | 30 | 27 | 100 |
| 3 | 7 | 28 | 25 | 100 |
| 4 | 6 | 21 | 26 | 100 |
| 5 | 17 | 20 | 15 | 100 |

As shown by Table I the five units of blood are rapidly filtered with excellent filtering efficiency.

The second filter tested uses a depth type media. The media comprises a first layer of a woven nylon fabric having a nominal pore size rating of 200 microns. Downstream of the woven fabric is a batt of polyester fibers. The batt is approximately 1 inch thick and comprises 1.5 denier, 1½ to 3 inch long fibers. Downstream of the fiber batt is a woven fabric having a pore size rating of 80 microns. Five units of blood, approximately 500 ml per unit, are passed through the filter by gravity flow. The results are given in the following Table II.

TABLE II

| Unit Number | Age of Blood in Days | Flow Rate (ml/min) Start | Flow Rate (ml/min) End | Filter Efficiency (% of particles larger than 16 microns that are removed) |
|---|---|---|---|---|
| 1 | 10 | 24 | 21 | 74 |
| 2 | 10 | 20 | 19 | 80 |
| 3 | 12 | 21 | 12 | 87 |
| 4 | 11 | 17 | 12 | 90 |
| 5 | 11 | 11 |  | 55 | flow stopped after 10 minutes when flow rate down to 3 ml/min

As may be seen from the above Table II the filter works satisfactorily for the first four units of blood. However, on the fifth unit the filter starts to plug and channel as evidenced by the fact that the filter efficiency drops to 55 percent.

The third filter tested uses a sieve type media. The media comprises a first layer of an open mesh plastic net having a nominal pore size rating of 1400 microns and a second downstream layer of a woven polyester fabric having a pore size rating of 40 microns. Five units of blood, approximately 500 ml per unit, are passed through this media by gravity flow. The results are given in the following Table III.

TABLE III

| Unit Number | Age of Blood in Days | Flow Rate (ml/min) Start | Flow Rate (ml/min) End | Filter Efficiency (% of particles larger than 16 microns that are removed) |
|---|---|---|---|---|
| 1 | 10 | 25 | 25 | 82 |
| 2 | 10 | 23 | 19 | 83 |
| 3 | 10 | 24 | 18 | 91 |
| 4 | 10 | 18 | 12 | 77 |
| 5 | 7 | 12 |  | 76 | flow stopped after 15 minutes when flow rate down to 6 ml/min

As shown by Table III the filter efficiency starts to drop off after the third unit is filtered and the filter becomes plugged during filtration of the fifth unit.

The fourth filter tested uses a depth type media. The media comprises a first layer of a mesh screen having a nominal pore size rating of 200 microns and a second downstream layer of a flexible polyurethane foam approximately 1 inch thick and having a nominal pore size rating of 20 microns. Only two units of blood, approximately 500 ml per unit, are passed through this media by gravity before the media starts to become plugged. The results are given in the following Table IV.

TABLE IV

| Unit Number | Age of Blood in Days | Flow Rate (ml/min) Start | Flow Rate (ml/min) End | Filter Efficiency (% of particles larger than 16 microns that are removed) |
|---|---|---|---|---|
| 1 | 10 | 18 | 13 | 79 |
| 2 | 10 | 13 | 9 | 84 |

Having thus described the present invention, it should be understood that many variations and modifications may be made without departing from the scope of the invention itself. The invention is only limited by the scope of the claims appended hereto.

What is claimed is:

1. A blood filter media comprising in combination the elements of an upstream filter sheet of a woven synthetic fiber fabric having a pore size of about 180 microns, a first downstream filter sheet of a layer of polyester or polyamide fibers, said layer having a thickness of at least 0.015 inch and a pore opening size in the range of from 8 – 38 microns, said layer consisting of fibers locked in position by the frictional entanglement of fibers with each other, such that said layer maintains said pore opening size range while uniformly filtering blood during extended use, and a second further downstream filter sheet of a woven synthetic fiber fabric having a pore size of about 20 microns, and the elements of said combination being co-operative to produce an efficiency of 100% in the removal of particles of size greater than 16 microns in the filtration of at least five pints of blood.

2. A blood filter element according to claim 1 wherein an open mesh plastic net is placed between the upstream filter sheet and the first downstream filter sheet.

3. A blood filter element according to claim 2 wherein the upstream surface of the first downstream filter sheet has a larger pore opening size than does the downstream surface of said sheet.

4. A blood filter element according to claim 2 wherein the fibers in the upstream filter sheet and the second downstream filter sheet are nylon filaments and the fibers in the first downstream filter sheet are polyester fibers.

* * * * *